United States Patent [19]

Eichenberger

[11] Patent Number: 4,876,920
[45] Date of Patent: Oct. 31, 1989

[54] DUAL RANGE INFINITELY VARIABLE TRANSMISSION

[75] Inventor: Peter Eichenberger, Livonia, Mich.

[73] Assignee: Ford Motor Company, Dearborn, Mich.

[21] Appl. No.: 216,065

[22] Filed: Jul. 7, 1988

[51] Int. Cl.$^4$ .................................................. F16H 37/00
[52] U.S. Cl. .......................................... 74/689; 74/681; 74/701
[58] Field of Search .................. 74/689, 701, 681, 740

[56] References Cited

U.S. PATENT DOCUMENTS

| | | | |
|---|---|---|---|
| H98 | 1/1988 | Lemieux et al. | 74/689 |
| 3,340,749 | 9/1967 | Magg et al. | 74/689 |
| 3,442,346 | 5/1969 | Winter et al. | 180/53 |
| 3,908,483 | 9/1975 | Piquette | 74/792 |
| 3,991,634 | 11/1976 | Longshore | 74/745 |
| 4,060,012 | 11/1977 | Giacosa | 74/689 |
| 4,290,320 | 9/1981 | Abbott | 74/689 |
| 4,294,137 | 10/1981 | Piret et al. | 74/701 X |
| 4,608,885 | 9/1986 | Kouvunen | 74/740 X |
| 4,660,438 | 4/1987 | Tatara et al. | 74/745 X |
| 4,685,358 | 8/1987 | Itoh | 74/740 X |
| 4,784,018 | 11/1988 | Okada et al. | 74/689 |

FOREIGN PATENT DOCUMENTS

| | | | |
|---|---|---|---|
| 56-90155 | 7/1981 | Japan | 74/689 |
| 58-149444 | 5/1983 | Japan | |
| 58-149448 | 5/1983 | Japan | |
| 2115091 | 9/1983 | United Kingdom | 74/689 |

Primary Examiner—Dwight G. Diehl
Assistant Examiner—Christopher Campbell
Attorney, Agent, or Firm—Donald J. Harrington; Keith L. Zerschling

[57] ABSTRACT

An infinitely variable transmission having a driving sheave assembly connected to the crankshaft of an internal combustion engine and coaxially mounted with respect to the crankshaft, an intermediate shaft upon which is mounted a driven pulley assembly, a drive chain or belt drivably connected the pulley assemblies, high range and low range gearing coaxially disposed with respect to the driven pulley assembly, a countershaft arranged in parallel and spaced disposition with respect to the secondary shaft wherein the countershaft is adapted to support forward and reverse gearing and improved bearing means for supporting the countershaft and wherein a differential output assembly connects torque output elements of the countershaft to each of two axle half shafts thus providing improved torque transmitting capacity with reduced overall dimensions due to reduced shaft spacing.

4 Claims, 4 Drawing Sheets

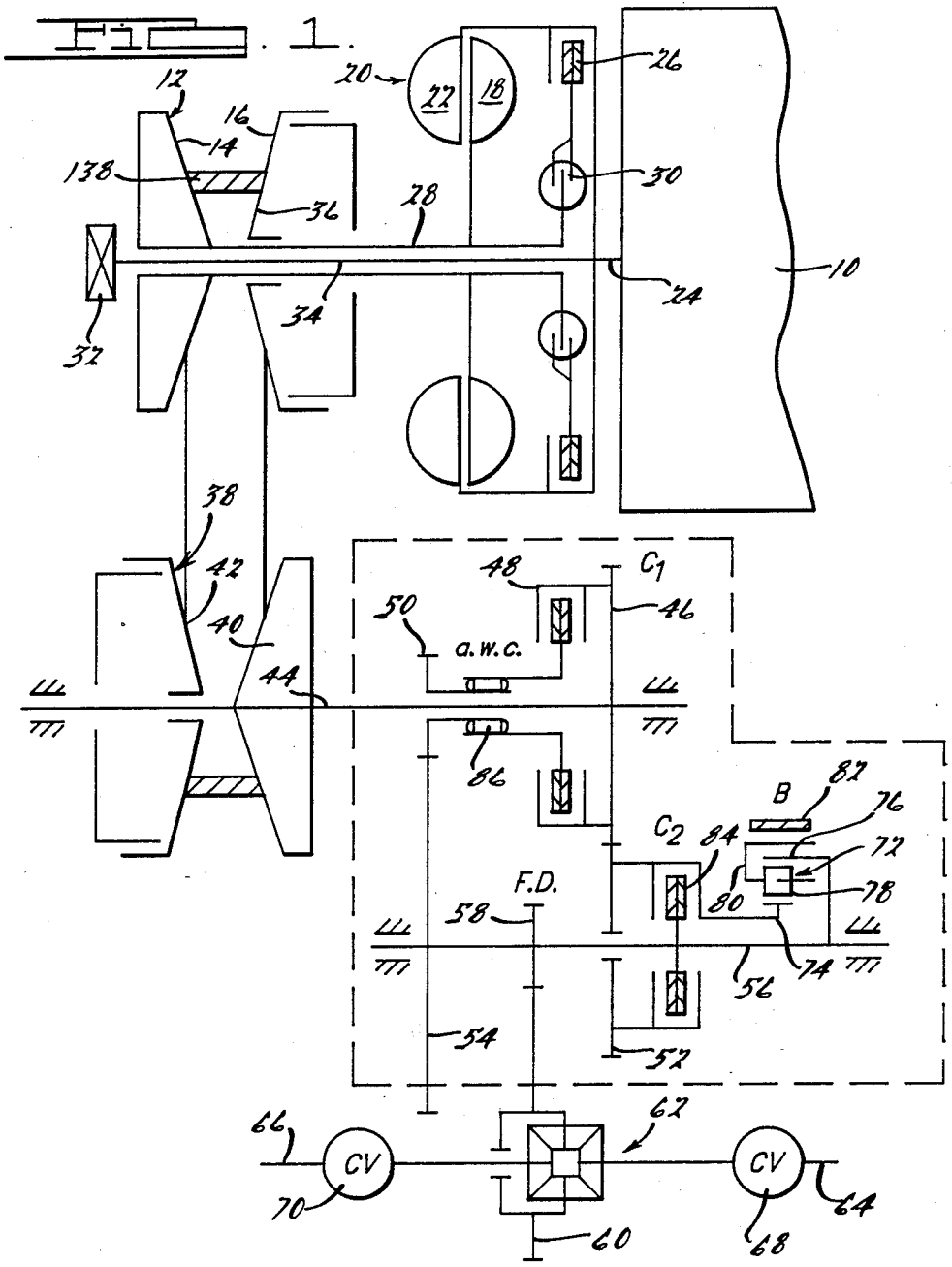

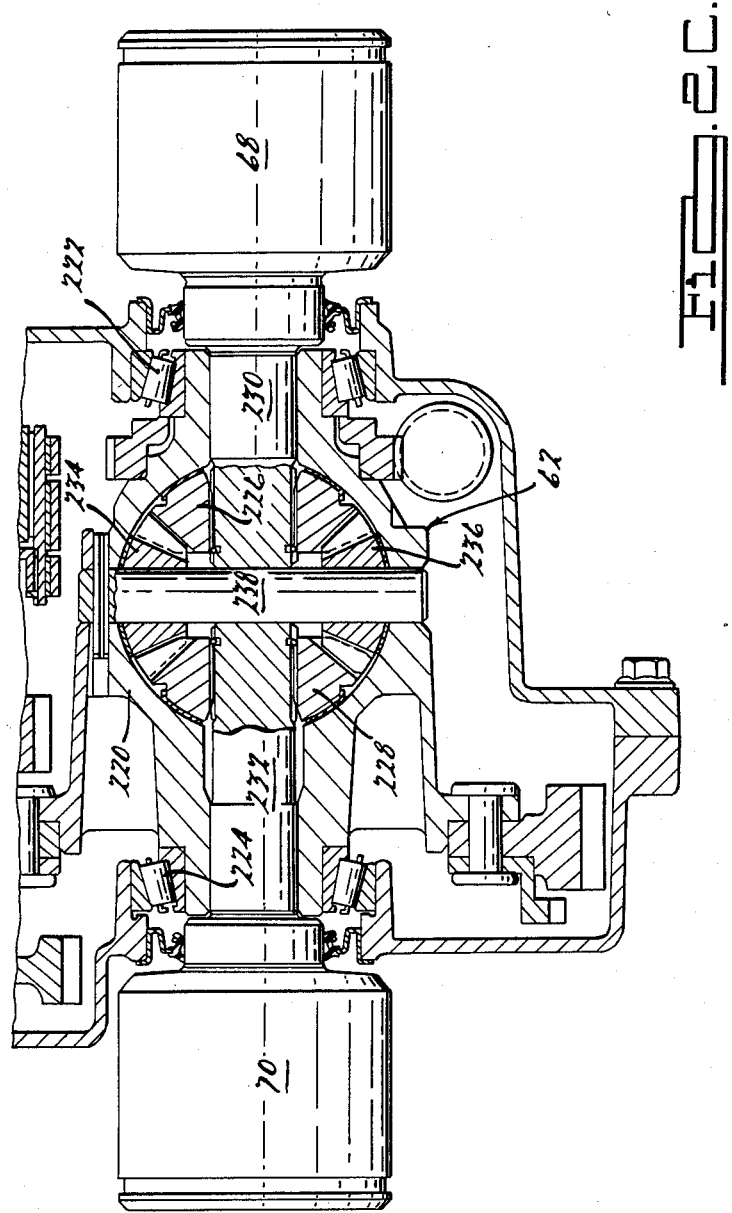

DUAL RANGE INFINITELY VARIABLE TRANSMISSION

BACKGROUND OF THE INVENTION

My invention relates to improvements in a transaxle for an automotive vehicle. In a preferred embodiment of the invention the driveline that includes the transaxle would be mounted in the engine compartment of the vehicle with the vehicle engine transversely disposed with respect to the centerline of the vehicle.

The transaxle comprises a torque input shaft arranged on an axis that is collinear with respect to the crankshaft axis, a secondary shaft arranged parallel and spaced from the torque input shaft axis, a countershaft arranged parallel to the secondary shaft, and a differential assembly. The differential assembly has two side gears, the axes of which are arranged parallel to and spaced from the axis of the countershaft. The side gears of the differential assembly are adapted to be connected to half shafts for the traction wheels of the vehicle.

An infinitely variable transmission of this type is shown in Winter et al U.S. Pat. No. 3,442,346. This reference describes a transmission for an agricultural tractor wherein the differential assembly is mounted on the axis of the driven sheave assembly and wherein shiftable dog clutches are used to effect ratio changes. An example of a countershaft transmission wherein the dog clutches have been replaced by selectively operable friction clutches for speed ratio changing may be seen in U.S. Pat. No. 3,991,634. The transmission of the '634 patent, however, does not employ infinitely variable ratio sheave assemblies. Other examples of countershaft gearing having shiftable dog clutches for effecting ratio changes, but without an infinitely variable drive portion, are described in Japanese patent specification Nos. 57-31608 and 57-32617, both dated Sept. 5, 1983.

BRIEF DESCRIPTION OF THE INVENTION

In my improved transaxle torque is distributed to a driving sheave assembly through a hydrokinetic unit. Provision is made for locking the hydrokinetic unit to establish a direct mechanical connection between the torque input sheave assembly and the crankshaft. A secondary sheave assembly is mounted on the secondary shaft, and the sheave assemblies are connected together by a drive chain or a drive belt in known fashion thereby providing an infinitely variable torque ratio. The torque multiplication range for the transaxle is established in part by the infinitely variable ratio sheave assemblies. The torque ratio is complemented by the gearing ratio of forward and reverse drive gearing mounted on the countershaft and by and high and low range gearing mounted on the intermediate shaft and on the countershaft. The high range gearing and the low range gearing can be selectively activated by controllable friction clutches which can be engaged and released to establish ratio changes between the high range and the low range.

The torque output element of the driven portions of the high range gearing and the low range gearing are mounted on an improved bearing support which occupies a minimum space and which permits a minimum center distance between the secondary shaft and the countershaft thereby reducing the overall dimensions of the transaxle. By using my improved bearing support, it is possible to locate the driven elements of the low range and high range gearing directly adjacent the driven sheave assembly since a bearing support, which normally would form a part of the transaxle casting or housing, is not needed. My improved bearing support requires an inner bearing race that may be assembled in an axial opening in the transaxle housing during assembly of the gearing. This simplifies the assembly procedure and eliminates complex machining operations on the transaxle case during manufacture.

My improved transaxle includes also a planetary forward and reverse gear. In this respect it is distinguishable from prior art designs, such as those described in the references mentioned above, which include shiftable dog clutches or synchronized elements in establishing a desired speed ratio for the gearing on the downstream side of the driven sheave assembly. By eliminating the need for synchronizer clutches or shiftable dog clutches a selection of forward drive or reverse drive can be obtained without a complex actuator mechanism. Only a compact fluid pressure operated clutch or brake is required to establish forward or reverse drive. The controls for actuating the clutch and brake, furthermore, require only a simplified hydraulic control system.

BRIEF DESCRIPTION OF THE FIGURES OF THE DRAWINGS

FIG. 1 is a schematic representation of the principal torque transmitting elements of my improved transaxle.

FIG. 1a is a chart showing the clutch and brake engagement and release pattern for the gearing of FIG. 1.

FIG. 2C is a partial cross-sectional view of the torque output differential assembly for my improved transaxle.

PARTICULAR DESCRIPTION OF THE INVENTION

Figure 2B:
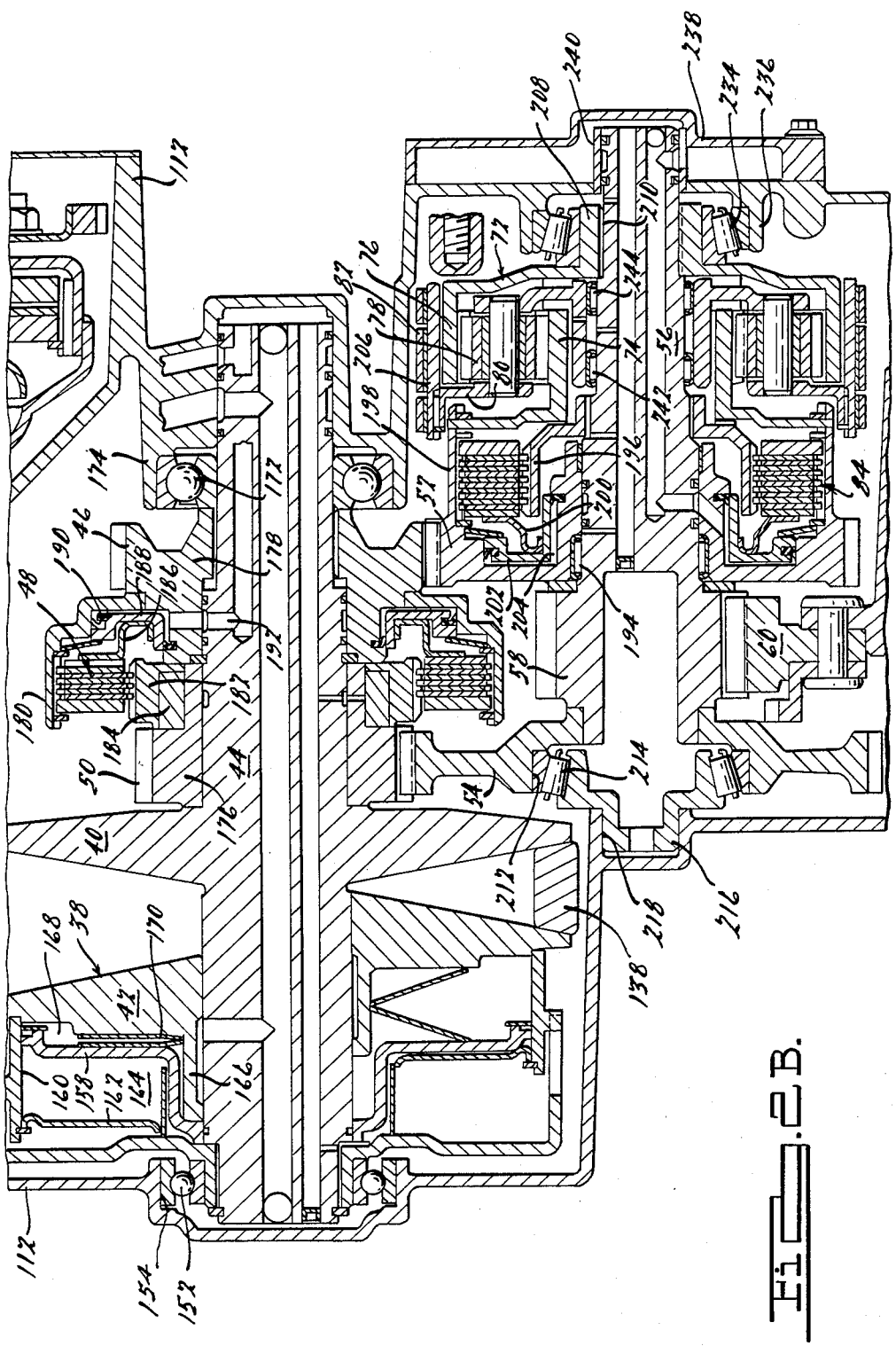
FIG. 2B is a partial assembly view shown in cross section illustrating the main gearing portions of my improved transaxle.

In the schematic view of FIG. 1 an internal combustion engine for a vehicle is shown at 10. An adjustable torque input sheave assembly 12 includes a fixed sheave portion 14 and an adjustable portion 16. Sheave portion 14 is connected to the turbine 18 of a hydrokinetic fluid coupling 20. The fluid coupling 20 includes an impeller 22 which is connected directly to the crankshaft 24 of the engine 10. Although I have shown a hydrokinetic fluid coupling in the embodiment described in this specification, a hydrokinetic fluid torque converter could be used as well if additional torque multiplication is required.

A hydrokinetic coupling lockup clutch 26 is connected to turbine shaft 28 by means of a damper assembly 30. Crankshaft 24 is connected to a positive displacement fluid pump 32 by means of a pump drive shaft 34 extending concentrically through the turbine shaft 28. The pump 32 supplies fluid pressure for the control system which will be described in the description of the clutches and brakes.

An adjustable sheave portion 36 cooperates with the fixed portion 14 and, as will be described, it is movable axially with respect to the turbine shaft 28 by a sheave adjusting servo.

A driven sheave assembly 38 includes a fixed sheave portion 40 and an adjustable sheave portion 42. Sheave portion 40 is connected drivably to countershaft 44. The adjustable sheave portion 42 is journalled on the axis of shaft 44 and can be moved axially with respect to the axis of shaft 44 by a fluid pressure servo, to be described subsequently.

Secondary shaft 44 is connected to high range gear 46. It is connected through selectively engageable friction clutch 48 to low range gear 50. The driven gear members of the high range gear and the low range gear are shown at 52 and 54, respectively. These are mounted on countershaft 56 and are arranged in parallel, spaced disposition with respect to the secondary shaft 44. Final drive gear 58 also mounted on the shaft 56 engages final drive output gear 60, which forms the torque input element for a differential gear assembly 62. The output side gears for the differential assembly 62 are connected to differential half shafts 64 and 66 through constant velocity universal joints 68 and 70, respectively.

A forward and reverse gear assembly 72 comprises sun gear 74, ring gear 76, planet pinions 78 and a carrier 80 supporting the pinions 78. Carrier 80 is adapted to be braked by brake band 82 to establish reverse drive operation. A forward drive clutch 84 connects the ring gear 76 with the sun gear 74 to establish direct drive forward operation as the brake 82 is released.

In FIG. 1a I have illustrated the clutch and brake engagement and release pattern for high range, low range and reverse drive for the transaxle illustrated in FIG. 1. Low range operation is achieved by engaging clutch 48 while clutch 84 and brake 82 are released. High range is achieved by releasing the clutch 48 and the brake 82 while applying the clutch 84. Reverse drive is achieved by applying the brake 82 and releasing both of the clutches 48 and 84.

In the embodiment shown I have provided a one-way clutch 86 which complements the clutch 48. By using the clutch 86 torque can be transmitted to the low range gear 50 from the shaft 54 during low range operation. When the clutch 84 is applied to establish high range operation, the one way clutch 86 is allowed to freewheel even if the clutch 48 remains applied. Thus a nonsynchronous ratio change is achieved without the necessity for synchronizing the engagement of clutch 84 with the release of clutch 48.

Figure 2A:
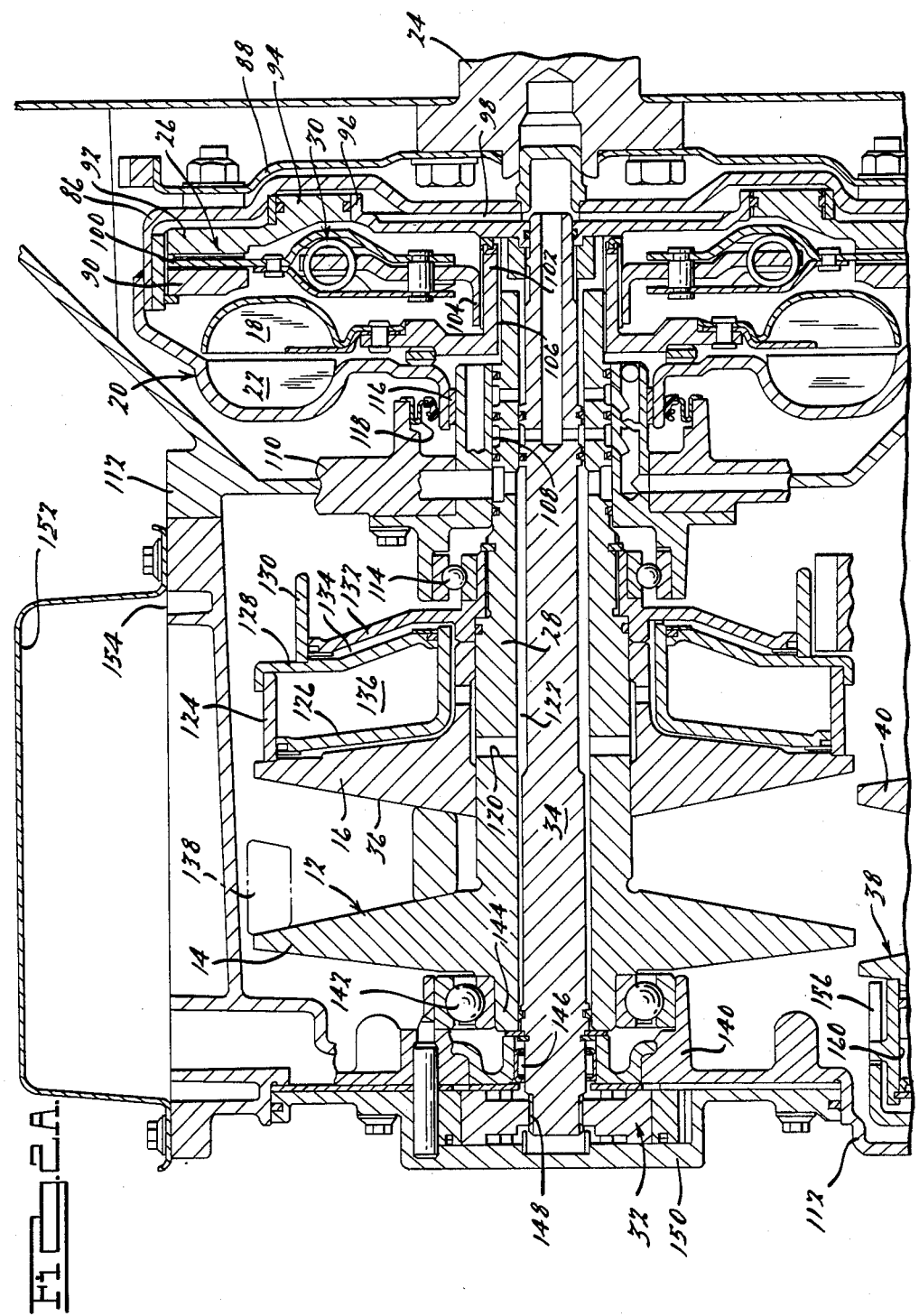
FIG. 2A is a partial cross-sectional view of the torque input assembly of my improved transaxle.

In FIG. 2A the impeller 22 of the coupling 20 comprises an impeller housing 86 which is connected to the crankshaft 24 through a driveplate assembly 88.

Lockup clutch 26 comprises a clutch pressure plate or reaction ring 90 carried on the inner periphery of the impeller housing. A piston plate 92 also is carried by the impeller housing. Piston plate 92 comprises a projection 94 received in a cooperating opening formed in plate 96 secured to the hub of impeller housing. Pressure is distributed between the plate 92 and the impeller housing through pressure passage 98 when the piston member 92 is pressurized. Clutch actuating pressure is applied to clutch disc 100 located between the reaction ring 90 and the piston 92. Clutch plate 100 is connected to turbine hub 102 through the damper assembly 30. The hub 104 of the damper assembly is splined to the hub 102.

Turbine shaft 28 is splined to the turbine hub at 106. Shaft 28 is received in shaft opening 108 in support wall 110 of the transaxle case 112. It is journalled by bearing 114 on the support wall 110.

Support wall 110 journals also impeller 22, a bushing 116 being provided as shown. Fluid seal 118 isolates the interior of the fluid coupling from the interior of the case 112.

Sheave portion 16 of the driving sheave assembly 12 is slidably positioned on shaft 28. Shaft 28 is provided with a pressure foot 120 which communicates with an annular passage 122 located between shaft 28 and the pump drive shaft 34.

Adjustable sheave portion 16 includes a cylindrical member 124 in which is disposed fixed piston 126. Cylinder portion 124 is connected to and is movable with annular wall 128 which carries cylindrical portion 130. Fixed piston 132 is splined to the shaft 28 and cooperates with wall 128 to define a pressure chamber 134. A vented chamber 136 is located between wall 128 and the fixed piston 126.

When pressure is supplied through the port 120, movable sheave portion 16 moves toward the fixed sheave portion 14 thereby increasing the effective pitch radius of a drive belt or chain 138.

The transmission case 112 comprises a bearing shoulder 140 which receives ball bearing 142 which journals the hub 144 of the fixed sheave portion 14. Pump drive shaft 34 is journalled by needle bearing assembly 146 and it is splined at 148 to the driving element of the positive displacement pump 32. Pump 32 is closed by a pump housing plate 150 bolted to the case 112.

A control valve assembly, not shown, is located within valve body cover 151 bolted to the upper surface 154 of the case 112.

Drive belt or chain 138 drivably connects torque input sheave assembly 12 with the torque output sheave assembly 38. Intermediate shaft 44 is journalled by bearing 152 received in bearing opening 154 in transaxle case 112. Bearing 152 journals also cylinder member 156 of a servo assembly for the adjustable sheave assembly 38. Fixed piston 158 is secured and supported by the shaft 44. It is located within movable cylinder 160 carried by the sheave portion 42. Annular plate 162 cooperates with the fixed piston 158 to define a pressure balancing cavity 164.

Sheave portion 42 includes a hub 166 slidably positioned on the shaft 44. It cooperates with piston portion 158 to define a pressure cavity 168. Belleville spring assembly 170 can be located within the pressure cavity 168 to provide a preload on the driven sheave assembly. This tends normally to urge the driven sheave assembly to the low speed ratio position.

The right hand end of the shaft 44 is journalled by ball bearing assembly 172 in bearing support 174 which forms a part of the transaxle case 112. Low speed range gear 176 is supported by the shaft 44 rotatably and high speed range gear is splined to the shaft 44. Gear 178 is formed integrally with clutch member 180. Clutch member 182, which is a part of the clutch assembly 48, is connected to the low speed range gear 50 through overrunning coupling 184. Clutch members 180 and 182 carry friction discs which are engaged by pressure plate 186 which is in turn carried by annul piston 188 received in annular cylinder 190 formed in the clutch member 180. When the pressure chamber defined by the piston 188 and cylinder 190 is pressurized by pressure distributed by port 192, clutch assembly 148 is applied.

Countershaft 56 rotatably journals high range output gear 52, bearing 194 being provided for that purpose. Clutch assembly 84 comprises a clutch member 196 splined to the shaft 56. Gear 52 includes another clutch portion 198 forming a part of the clutch assembly 84. Clutch portions 198 and 196 carry friction discs which are engageable upon application of pressure by a pressure plate 200. Pressure plate 200 forms a part of clutch piston 202 received in annular cylinder 204.

When the clutch assembly 84 is applied, torque is transmitted directly from the intermediate shaft 44 to the countershaft 56 through the clutch assembly 84.

Planetary gear assembly 72 comprises sun gear 74 which is connected directly to the high speed range torque output gear 52.

Carrier 80 forms a part of brake drum 206, which is surrounded by the brake band 82. When the brake band 82 is applied, torque distributed to the sun gear 74 causes ring gear 76 to rotate in the reverse direction. Ring gear 76 has a hub 208 which is splined at 210 to the shaft 56. When the brake 82 is applied and the clutch assembly is released, shaft 56 is rotated in a reverse direction. When the brake 82 is released and the clutch assembly 84 is applied, direct drive is established in the gear unit 72 and torque is distributed through the clutch assembly 84 to the shaft 56 in a forward driving direction.

Shaft 56 is formed integrally with gear 58, which in turn is connected integrally with the gear 54. Gear 54 includes a bearing pocket 212 which receives a tapered roller bearing assembly 214. The inner race of the bearing assembly 214 has a boss 216 received in a bearing pocket 218 formed in the transaxle housing or case 112. No other bearing support is required other than the inner race and boss assembly for the bearing 214. The gear 54 thus is disposed in axial disposition directly adjacent the driven sheave assembly 38 thereby reducing the center distance of the shafts 44 and 56.

Gear 58 meshes with the final drive gear 60, which is secured to and is rotatable with differential housing 220. The housing is journalled in a straddle mount fashion by tapered roller bearings 222 and 224 for rotation about an axis that is parallel to and spaced from the countershaft axis. Differential side gears 226 and 228 are secured to output shafts 230 and 232, respectively. These mesh with differential pinions 234 and 236 which are supported by pinion shaft 238. Shaft 238 in turn is carried by the carrier housing 220. The shafts 230 and 232 are connected to the inboard ends of axle half shafts, not shown, for driving the vehicle traction wheels, universal joints 68 and 70 being provided for this purpose.

The right hand end of shaft 56 is journalled by tapered roller bearing assembly 234. It is supported by bearing support 236. End cap 238 is bolted over the end of the countershaft 56 to provide a fluid pressure distributor manifold 240 which communicates with axially arranged pressure distributor passages in the shaft 56 which lead to ports that supply pressure to the clutch assembly 84 and lubrication pressure to the bearings including bearings 194. Similar bearings for journalling the planetary pinion assembly are shown at 242 and 244.

The transaxle case 12 is formed in two cast sections as seen in FIGS. 2A, 2B and 2C, the sections being bolted in side-by-side relationship as seen in these Figures. This two part construction makes it feasible to install the bearing assembly shown in part at 214 and 216. This bearing arrangement makes it possible to reduce the center distance between the axes for countershaft 56 and the driven sheave assembly whereby gear 54 is located axially adjacent sheave portion 40.

Having described a preferred embodiment of my invention, what I claim and desire to secure by U.S. Letters Patent is:

1. In a transaxle assembly comprising an infinitely variably belt and sheave assembly having driving sheave portions and driven sheave portions, a housing assembly enclosing said sheave portions;

a torque input shaft coaxially disposed with respect to the driving sheave portions, means for drivably connecting the driving sheave portions and said input shaft;

a secondary shaft having an axis in spaced parallel relationship with respect to said torque input shaft, said driven sheave portions being mounted for rotation on the axis of said secondary shaft;

a flexible drive member drivably connected to said input sheave portions and said output sheave portions, said flexible drive member engaging said input and output sheave portions at an effective pitch diameter for each sheave portion;

fluid pressure servo means for adjustably positioning said sheave portions to effect variations in the effective pitch diameters of said driving sheave portions and said driven sheave portions;

a countershaft mounted in spaced parallel disposition with respect to said secondary shaft, a bearing assembly means for journalling said countershaft in said housing assembly, a high speed range gear train and low speed range gear train connecting said secondary shaft with said countershaft;

fluid pressure operated clutch means for activating and deactivating selectively said high speed range gear train and said low speed range gear train;

planetary forward and reverse gear means disposed concentrically with respect to said countershaft including clutch means for establishing a one-to-one driving relationship through said planetary gear means and a brake for establishing a reverse drive ratio;

said countershaft being disposed relative to said secondary shaft so that said low speed range gear train is disposed between said driven sheave portions and said fluid pressure operated clutch means and in proximity to said secondary shaft adjacent said driven sheave portions whereby the center distance between said secondary shaft and said countershaft and the dimensions of said transaxle measured in the direction of said axis are reduced.

2. The combination as set forth in claim 1 wherein said bearing assembly means for said countershaft includes a tapered thrust roller bearing, said thrust roller bearing including a bearing race, and means for supporting said bearing race in said housing assembly.

3. In a transaxle assembly comprising an infinitely variably belt and sheave assembly having driving sheave portions and driven sheave portions, a housing assembly enclosing said sheave portions;

a torque input shaft coaxially disposed with respect to the driving sheave portions, means for drivably connecting the driving sheave portions and said input shaft;

a secondary shaft having an axis in spaced parallel relationship with respect to said torque input shaft, said driven sheave portions being mounted for rotation on the axis of said secondary shaft;

a flexible drive member drivably connected to said input sheave portions and said output sheave portions, said flexible drive member engaging said input and output sheave portions at an effective pitch diameter for each sheave portion;

fluid pressure servo means for adjustably positioning said sheave portions to effect variations in the effective pitch diameters of said driving sheave portions and said driven sheave portions;

a countershaft mounted in spaced parallel disposition with respect to said secondary shaft, a bearing assembly means for journalling said countershaft in said housing assembly, a high speed range gear train and low speed range gear train connecting said secondary shaft with said countershaft;

fluid pressure operated clutch means for activating and deactivating selectively said high speed range gear train and said low speed range gear train;

planetary forward and reverse gear means disposed concentrically with respect to said countershaft including clutch means for establishing a one-to-one driving relationship through said planetary gear means and a brake for establishing a reverse drive ratio;

said countershaft being disposed relative to said secondary shaft so that said low speed range gear train is disposed between said driven sheave portions and said fluid pressure operated clutch means and in proximity to said secondary shaft adjacent said driven sheave portions whereby the center distance between said secondary shaft and said countershaft and the dimensions of said transaxle measured in the direction of said axis are reduced;

said bearing means for said countershaft comprising a bearing support formed in said housing at one axial end of said countershaft, a bearing race received in said bearing support, a bearing assembly supported by said race for journalling said low speed range gear train and said high speed range gear train at said one end of said countershaft and second bearing means located at the other end of said countershaft.

4. The combination as set forth in claim 3 wherein said bearing means for said countershaft is a tapered thrust roller bearing, said thrust roller bearing including a bearing race, and means for supporting said bearing race in said transaxle housing.

* * * * *